(12) United States Patent
Kim

(10) Patent No.: US 6,859,253 B2
(45) Date of Patent: Feb. 22, 2005

(54) DIP SEALING A LIQUID CRYSTAL DISPLAY PANEL

(75) Inventor: Chul Gi Kim, Kyongsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 148 days.

(21) Appl. No.: 10/224,388

(22) Filed: Aug. 21, 2002

(65) Prior Publication Data

US 2003/0038915 A1 Feb. 27, 2003

(30) Foreign Application Priority Data

Aug. 21, 2001 (KR) .......................................... 2001-50409

(51) Int. Cl.$^7$ .............................................. G02F 1/1339
(52) U.S. Cl. ........................ 349/190; 349/153; 349/154; 349/155
(58) Field of Search ................................. 349/190, 155, 349/153, 154

(56) References Cited

U.S. PATENT DOCUMENTS

| | | | |
|---|---|---|---|
| 4,364,168 A | 12/1982 | Matsuyama et al. | |
| 5,828,435 A | * 10/1998 | Kato et al. | 349/190 |
| 6,118,509 A | 9/2000 | Miyake | |
| 6,151,097 A | * 11/2000 | Matuzawa | 349/190 |
| 6,195,149 B1 | * 2/2001 | Kodera et al. | 349/187 |

FOREIGN PATENT DOCUMENTS

| | | | | |
|---|---|---|---|---|
| JP | 58123521 A | * | 7/1983 | G02F/1/133 |
| JP | 58198022 A | * | 11/1983 | G02F/1/13 |

\* cited by examiner

*Primary Examiner*—Huyen Ngo
(74) *Attorney, Agent, or Firm*—Birch, Stewart, Kolasch & Birch, LLP

(57) ABSTRACT

A method of fabricating a liquid crystal display panel which achieves a reduction in sealing time and eliminates failure due to an excessive intake of a sealing material by utilizing a dip-type sealing apparatus capable of simultaneously sealing a plurality of liquid crystal injection inlets in a plurality of liquid crystal display panels. The liquid crystal display panel is fabricated by preparing first and second substrates, forming a sealant along the periphery of one of the first and second substrates, the sealant having an injection hole, introducing liquid crystals between the first and second substrates through the injection hole, and forming a sealing material in the injection hole by making dip-type contact between the sealing material and the injection hole.

15 Claims, 3 Drawing Sheets

DIP SEALING A LIQUID CRYSTAL DISPLAY PANEL

This application claims the benefit of the Korean Application No. P2001-050409 filed on Aug. 21, 2001, which is hereby incorporated by reference.

BACKGROUND OF THE INVENTION

1. Field of the Invention

The present invention relates to a method of fabricating a liquid crystal display panel, and more particularly, to a method of manually sealing a liquid crystal injection inlet of a liquid crystal display panel.

2. Discussion of the Related Art

Lately, a liquid crystal display device highlighted as a flat panel display exhibits a high contrast ratio, is suitable for displaying gray scales or moving pictures, and requires less power consumption. However, efforts are continually being made to research and develop the liquid crystal display device.

The liquid crystal display device includes a liquid crystal display panel constituted with TFT(thin film transistor) and color filter substrates confronting each other and a liquid crystal layer formed between the two substrates. A method of fabricating a liquid crystal display panel according to related art is explained by referring to the attached drawings as follows.

FIG. 1 illustrates a flowchart of a method of fabricating a liquid crystal display panel according to a related art, and FIG. 2 schematically illustrates a method of manually sealing a liquid crystal injection inlet according to related art.

Referring to FIG. 1, first and second substrates are prepared (S10) as follows:

The first substrate is prepared by successively forming a black matrix on a transparent substrate so as to prevent light leakage, a color filter layer of red, green, and blue between the black matrix, and a common electrode on the entire surface including the color filter layer by deposition of ITO (indium tin oxide).

The second substrate is prepared by successively forming a plurality of gate and data lines on the other transparent substrate so as to cross with each other, a thin film transistor on each intersection between the gate and data lines so as to consist of a gate electrode, a gate insulating layer, a semiconductor layer, and source/drain electrodes, and a pixel electrode made of ITO to be connected electrically to the drain electrode of the thin film transistor.

Subsequently, a spacer is scattered evenly on the first substrate so as to maintain a uniform cell gap. A sealant is printed thick on the second substrate so as to leave a portion (hereinafter called liquid crystal injection inlet) of the second substrate for injecting liquid crystals (S11).

After the two substrates have been attached to each other so as to confront each other, hot pressure is applied to the attached substrates to harden the sealant and completely bond the two substrates to each other (S12).

After a vacuum state has been achieved inside the bonded substrates, liquid crystals are injected inside the bonded substrates through the liquid crystal injection inlet using capillary action and atmospheric pressure differences. The liquid crystal injection inlet is then sealed under a pressurization state so as to prevent the liquid crystals from completely leaking to the outside (S13).

In this case, the liquid crystal injection inlet is sealed automatically by 1CST (cassette) unit. Namely, after a number of liquid crystal display panels (usually, 60 panels) have been loaded simultaneously on a cassette, a sealing material is coated on the liquid crystal injection inlets using an automated machine.

If the automated machine experiences some difficulty so as to be unable to perform the automatic sealing step, as shown in FIG. 2, a worker manually coats the liquid crystal injection inlet of the liquid crystal panel 3 with a sealing material, one-by-one, using a sealing apparatus 1.

The sealing apparatus 1 functions like a syringe. A predetermined amount of the sealing material 4 sticks to an end of the syringe to be coated on the liquid crystal injection inlet 2 of the liquid crystal display panel 3.

The automatically or manually coated sealing material is then heated or irradiated with UV-rays to a hardened state. Thus, the liquid crystal injection inlet becomes completely sealed or airtight.

After a cleaning process has been carried out using ultrasonic waves so as to remove particles and the like adhering to an outer surface of the LC-injected liquid crystal display panel, the exterior of the liquid crystal display panel is inspected and the failure/pass criteria of the liquid crystal display panel is judged by applying an electrical signal thereto so as to compete the fabrication of the liquid crystal display panel.

Unfortunately, the method of fabricating a liquid crystal display panel according to the related art has the following disadvantages or problems:

First of all, when the automatic sealing operation of the liquid crystal injection inlet experiences some difficulty requiring the worker to seal the liquid crystal injection inlet manually, each of the liquid crystal injection inlets of the liquid crystal display panels must be coated with the sealing material, one-by-one, in creating a plurality of the liquid crystal display panels. The sealing material formed on the liquid crystal injection inlets hardens simultaneously. Eventually, the time required to form the sealing material is extended, whereby the sealing material flows inside the liquid crystal display panel where it is seldom hardened by UV-ray irradiation.

Secondly, since the sealing operation is carried out manually using the syringe type sealing device, the sealing time becomes longer which reduces productivity as well as the result of irregular sealing of the liquid crystal injection inlets of the liquid crystal display panels.

Finally, if the sealing material is excessively formed so as to flow outside the liquid crystal injection inlet, waste of the sealing material is inevitable.

SUMMARY OF THE INVENTION

Accordingly, the present invention is directed to a method of fabricating a liquid crystal display panel that substantially obviates one or more of the limitations and disadvantages of the related art.

The present invention provides a method of fabricating a liquid crystal display panel which reduces the sealing time and prevents failure due to an excessive intake of sealing material by using a dip type sealing apparatus capable of simultaneously sealing a plurality of liquid crystal injection inlets of liquid crystal display panels.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of fabricating a liquid crystal display panel according to the present invention includes preparing first and second substrates, forming a sealant along the periphery of one of the first and second substrates, the sealant having an injection hole, forming liquid crystals between the first and second substrates through the injection hole, and forming a sealing material on the injection hole by placing the injection hole in contact with the sealing material disposed in a tray.

Thus, according to the present invention, the sealing material is adapted to contact a plurality of liquid crystal display panels to be sealed collectively so as to reduce the sealing time as well as to avoid failure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
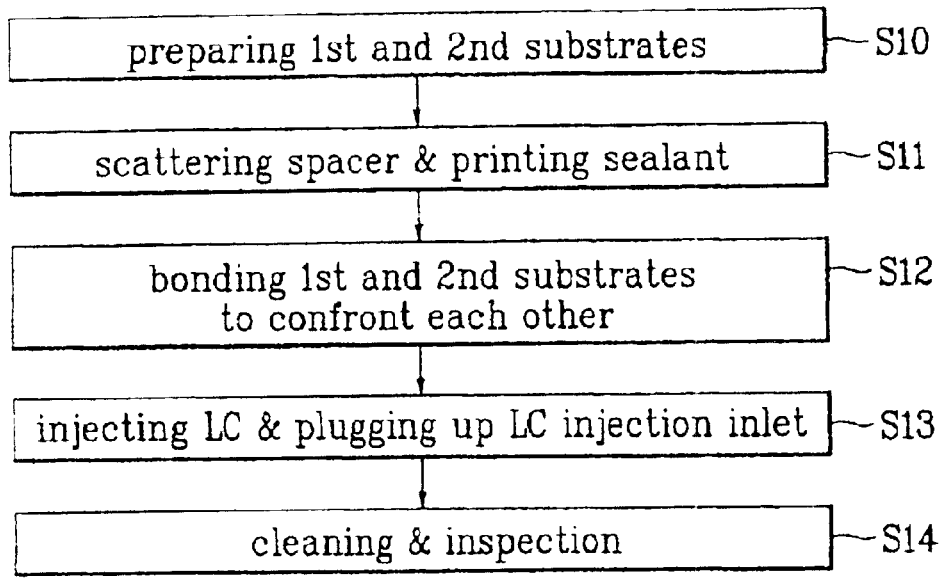
FIG. 1 illustrates a flowchart of a method of fabricating a liquid crystal display panel according to related art.
Figure 2:
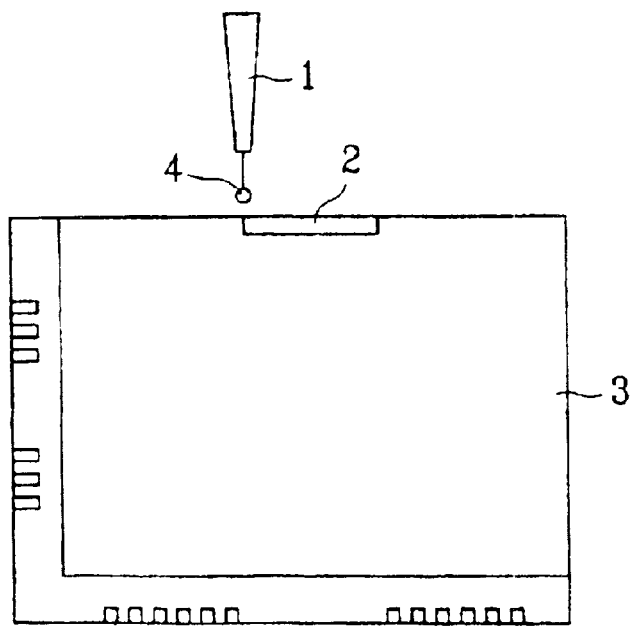
FIG. 2 illustrates a schematic diagram for explaining a method of sealing a liquid crystal injection inlet manually according to related art.
Figure 3:
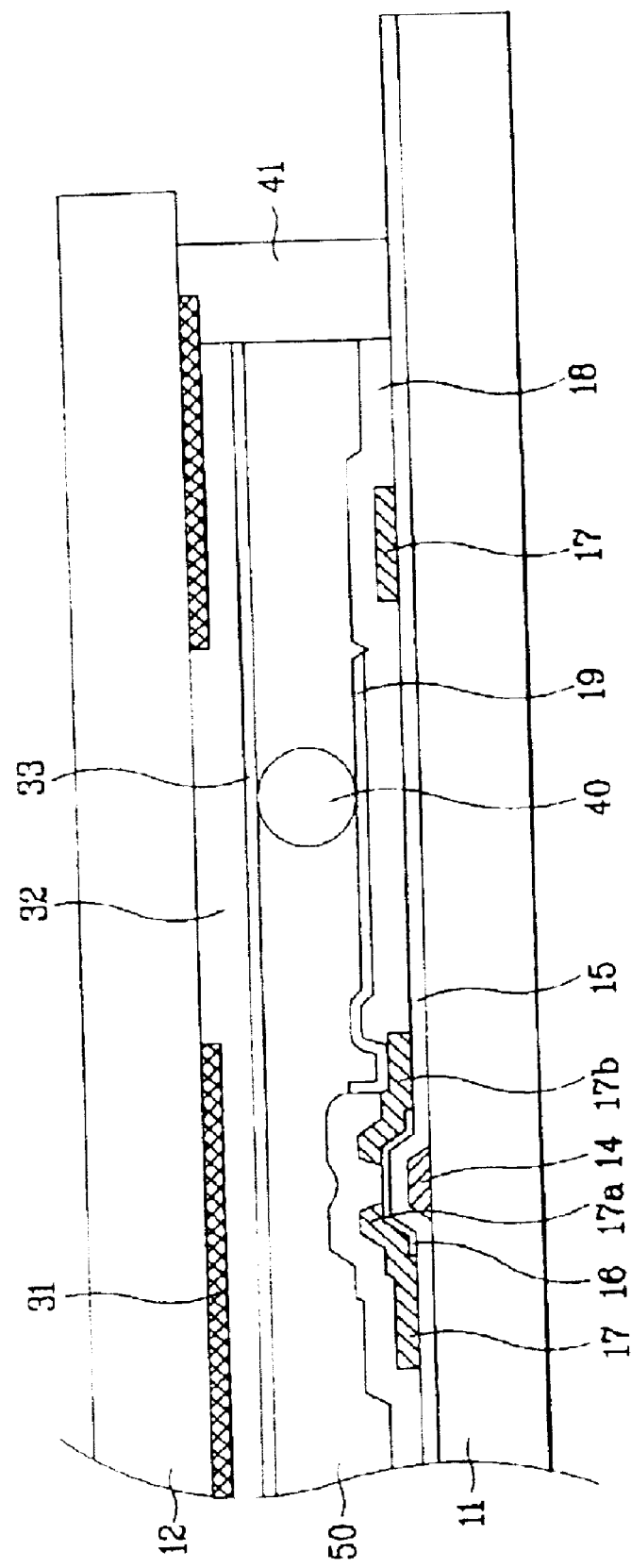
FIG. 3 illustrates a cross-sectional view of a liquid crystal display panel according to the present invention.
Figure 4:
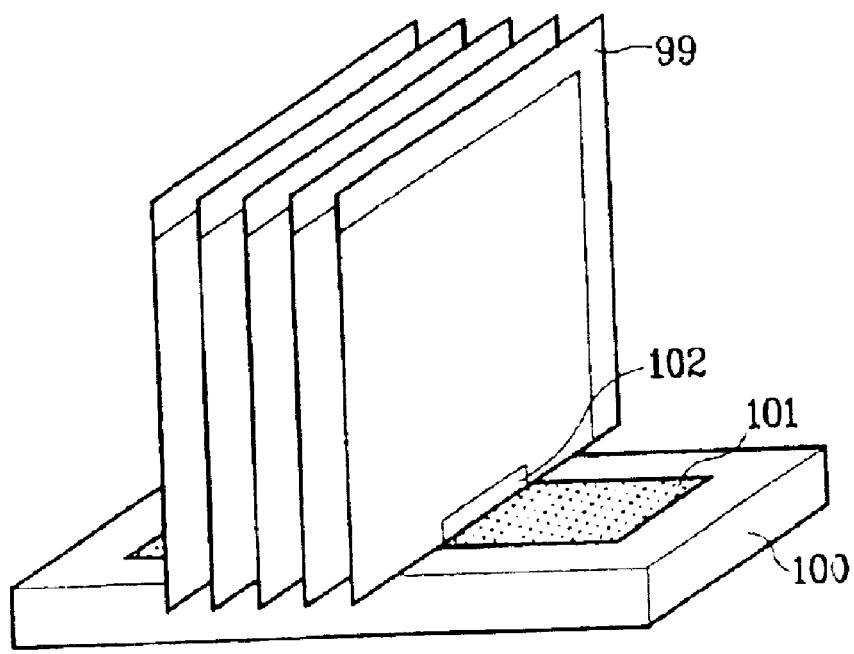
FIG. 4 illustrates a process of sealing liquid crystal injection inlets of liquid crystal display panels according to the present invention.
Figure 5:
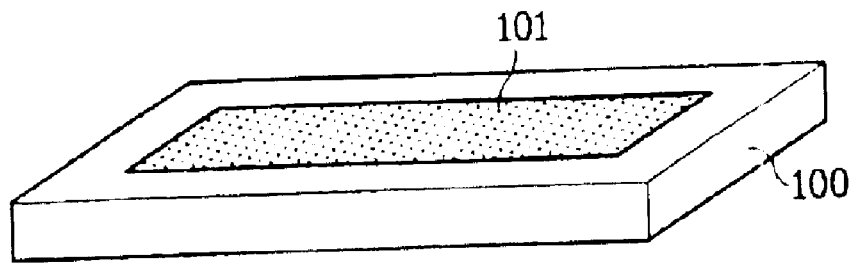
FIG. 5 illustrates a tray filled with a sealing material according to the present invention.

FIG. 3 illustrates a cross-sectional view of a liquid crystal display panel according to the present invention, FIG. 4 illustrates a system for sealing liquid crystal injection inlets of liquid crystal display panels according to the present invention, and FIG. 5 illustrates a tray filled with a sealing material according to the present invention.

First of all, a method of fabricating a liquid crystal panel according to the present invention before the sealing process is explained by referring to FIG. 3 as follows.

First of all, scan lines (not shown in the drawing) for transferring a scan signal and signal lines 17 for transferring a video signal are formed on a first transparent substrate 11 to cross with each other so as to define a plurality of pixel areas, and a thin film transistor is formed on each intersection between the scan and signal lines.

The thin film transistor includes a gate electrode 14 extending from the scan line, a gate insulating layer 15 formed on the entire surface of the substrate including the gate electrode 14, a semiconductor layer 16 formed on the gate insulating layer 15, a source electrode 17a extending from the signal line 17, and a drain electrode 17b confronting the source electrode 17a. The thin film transistor plays a role in transferring the video signal to each of the pixel areas selectively in accordance with the scan signal.

Subsequently, a passivation layer 18, i.e., an organic or inorganic insulator, is formed on the entire surface of the substrate including the thin film transistor. A pixel electrode 19 is then formed of an ITO based material on the passivation layer so as to be electrically connected to the corresponding thin film transistor.

The gate insulating layer 15 and passivation layer 18 can be formed of an inorganic material such $SiN_x$, $SiO_x$, or the like or an organic material such as BCB (benzocyclobutene), acrylic based material, or the like.

Moreover, a black matrix layer 31 is formed on areas where the scan/signal lines and thin film transistor are formed so as to prevent light leakage. A color filter layer 32 colored by R (red), G (green), and B (blue) respectively is formed on the black matrix layer 31 using one of such methods as dye application, electrodeposition, pigment dispersion, print, etc. A common electrode 33 made of an ITO based material is then formed on the entire surface of the substrate including the color filter layer 32.

An overcoating layer (not shown in the drawing) may further be formed between the color filter layer 32 and common electrode 33 so as to protect the color filter layer 32 as well as planarize the substrate.

Also, an alignment layer can be formed on at least one of the two substrates for initial alignment of liquid crystals.

The alignment layer may be formed by carrying out a rubbing process on a polyamide or polyimide based compound, PVA (polyvinyl alcohol), polyamic acid, or the like. Instead, the alignment layer can be formed by carrying out a photo alignment process on a photo-reactive material such as PVCN (polyvinylcinnamate), PSCN (polysiloxanecinnamate), and CelCN (cellulosecinnamate) based compounds.

Thereafter, a sealant 41 is formed outside an active area of one of the two substrates 11 and 12. In this case, the sealant is mainly a thermo-hardening sealant, and a liquid crystal injection inlet is formed by not forming the sealant 41 in a predetermined area.

There are a number of methods, e.g., a screen printing method, a dispensing method, and the like, for forming the sealant. The screen printing method may cause damage on the alignment layer and the like formed on the substrate since the screen physically contacts the substrate. Also, the screen printing method is uneconomical since sealant loss of a large-size substrate increases. Therefore, the dispensing method is preferable.

Subsequently, a spacer 40 is scattered uniformly on one of the substrates 11 and 12.

The first and second substrates 11 and 12 are attached to confront each other and the sealant 41 is then hardened by heating the attached substrates in a pressurized state to make the attached substrates completely adhere to each other.

Finally, liquid crystals 50 are injected between the first and second substrates 11 and 12 through the liquid crystal injection inlet, thereby completing the liquid crystal display panel.

The liquid crystal injection process is explained in detail as follows. First of all, the bonded substrates are placed in a vacuum chamber so as to maintain a vacuum state inside the space between the substrates. The composite is then dipped into a liquid crystal tray. Once the vacuum state is established and maintained inside the space between the substrates, liquid crystals are drawn into the space between the substrates by capillary action. When the space between the substrates becomes filled with the liquid crystals to some degree, nitrogen gas ($N_2$) is injected slowly into the vacuum chamber. A pressure difference between the space of the substrates and surroundings is then generated so that the liquid crystals fill the vacant space between the substrates. Thus, the liquid crystal layer is formed between the two substrates.

Finally, the liquid crystal injection inlet of the liquid crystal display panel, in which the liquid crystal layer is formed, is sealed.

The process of sealing the liquid crystal injection inlets according to the present invention is carried out simultaneously by the dip system, which is explained by referring to FIG. 4 and FIG. 5 as follows.

Referring to FIG. 4, a tray 100 is filled with sealing material 101 from top to bottom. A plurality of liquid crystal display panels 99 are positioned vertically so that liquid crystal injection inlets 102 contact the sealing material 101. The sealing material 101 thus sticks to each of the liquid crystal injection inlets 102.

The tray 100, as shown in FIG. 5, has the same shape as the liquid crystal container used for the liquid crystal injection.

In this case, an interval between the first and second substrates is narrow, e.g., 4~5 μm and the inner pressure inside the liquid crystal display panel is great. Therefore, the liquid crystals are prevented from flowing out through the liquid crystal injection inlet, even when the liquid crystal display panel is positioned vertically.

Contrary to the method of sealing each liquid crystal display panel, one-by-one, using the syringe type sealing apparatus according to the related art, the process according to the present invention simultaneously seals a plurality of the liquid crystal injection inlets of the liquid crystal display panels as a group, thereby substantially reducing the sealing time.

Finally, a plurality of the above-sealed liquid crystal display panels are loaded into a cassette, and then the sealing material is hardened. Thus, the liquid crystal display panel is sealed completely thereby preventing the liquid crystals from flowing to the outside.

Thermo-hardening resins, UV-ray-hardening resins, or the like can be used as the sealing material in the present invention. An epoxy based UV-ray hardening resin is particularly advantageous.

After a cleaning process is carried out using ultrasonic waves so as to remove particles and the like adhering to an outer surface of the LC-injected liquid crystal display panel, the exterior of the liquid crystal display panel is inspected and failure/pass of the liquid crystal display panel is determined by applying an electrical signal thereto to complete the fabrication of the liquid crystal display panel.

The method of fabricating the liquid crystal display panel according to the present invention has the following advantages or benefits.

First of all, it is possible to simultaneously seal a plurality of liquid crystal injection inlets of liquid crystal display panels as a group when the present invention is used for a manual sealing by a worker. Therefore, the present invention achieves a substantial reduction of the sealing time.

The present invention eliminates failure caused by the intake of excessive sealing material due to the delayed sealing time, thereby providing an excellent sealing state of the liquid crystal display panel.

Moreover, since the present invention simultaneously seals a plurality of the liquid crystal injection inlets of the liquid crystal display panels, the sealing states of the respective liquid crystal display panels is uniform. Also, the sealing process time is reduced which improves productivity.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of fabricating a plurality of liquid crystal display panels, each comprising the steps of:

preparing first and second substrates;

providing a sealant along the periphery of one of the first and second substrates, said sealant containing an injection hole;

introducing liquid crystals through the injection hole between the first and second substrates; and forming a sealing material in the injection hole by making dip-type contact of the injection hole with the sealing material, wherein the injection holes of the plurality of liquid crystal display panels are simultaneously sealed with the sealing material, and the sealing material only seals the injection hole without overflow to the liquid crystals.

2. The method of claim 1, wherein the sealing material is disposed in a tray where said dip-type contact is effected.

3. The method of claim 2, wherein the plurality of liquid crystal display panels are positioned vertically on the tray with the injection holes touching the sealing material.

4. The method of claim 1, further comprising hardening the sealing material formed on each injection hole.

5. The method of claim 4, wherein the sealing material is hardened by applying UV-rays thereto.

6. The method of claim 4, wherein the sealing material is hardened by applying heat thereto.

7. The method of claim 1, further comprising forming a spacer on one of the first and second substrates.

8. The method of claim 1, wherein the sealant is formed by a screen printing method.

9. The method of claim 1, wherein the sealant is formed by a dispensing method.

10. The method of claim 1, wherein the first substrate is prepared by:

forming scan and signal lines on the first substrate so as to cross with each other;

forming a thin film transistor at an intersection between the scan and signal lines;

forming a pixel electrode connected electrically to the thin film transistor; and forming a first alignment layer on the first substrate.

11. The method of claim 10, wherein the second substrate is prepared by:

forming a black matrix layer on the second substrate;

forming a color filter layer on the black matrix layer;

forming a common electrode on an entire surface of the second substrate; and forming a second alignment layer on the second substrate.

12. The method of claim 1, wherein the second substrate is prepared by:

forming a black matrix layer on the second substrate;

forming a color filter layer on the black matrix layer;

forming a common electrode on an entire surface of the second substrate; and forming a second alignment layer on the second substrate.

13. The method of claim 1, wherein an interval between the first and second substrates is sufficiently narrow so that the liquid crystals are prevented from flowing out through the injection hole.

14. The method of claim 13, wherein the interval is 4–5 $\mu$m.

15. The method of claim 1, wherein a container of the liquid crystals has a substantially same shape as a tray of the sealing material.

* * * * *